(12) United States Patent
Counts (10) Patent No.: US 7,646,291 B2
(45) Date of Patent: Jan. 12, 2010

(54) METHOD FOR AUTOMOTIVE LAMP CONTROL

(75) Inventor: Richard C. Counts, Cedar Park, TX (US)

(73) Assignee: SafeCode, Inc., Cedar Park, TX (US)

( * ) Notice: Subject to any disclaimer, the term of this patent is extended or adjusted under 35 U.S.C. 154(b) by 284 days.

(21) Appl. No.: 10/989,128

(22) Filed: Nov. 15, 2004

(65) Prior Publication Data

US 2006/0114108 A1 Jun. 1, 2006

(51) Int. Cl.
*B60Q 1/26* (2006.01)

(52) U.S. Cl. .................. 340/468; 340/458; 340/475; 315/76

(58) Field of Classification Search ............ 340/468, 340/458, 432, 475, 478, 479, 463, 467; 315/76–84
See application file for complete search history.

(56) References Cited

U.S. PATENT DOCUMENTS

| | | | | |
|---|---|---|---|---|
| 3,935,470 A | 1/1976 | Cake | ............. | 307/105 |
| 4,342,906 A | 8/1982 | Hyatt | ............. | 250/205 |
| 4,463,341 A * | 7/1984 | Iwasaki | ............. | 340/310.13 |
| 5,398,041 A | 3/1995 | Hyatt | ............. | 345/88 |
| 5,767,589 A | 6/1998 | Lake et al. | ............. | 307/10.8 |
| 5,790,017 A * | 8/1998 | Berryhill | ............. | 340/475 |
| 5,900,679 A * | 5/1999 | Lake et al. | ............. | 307/10.8 |
| 6,087,932 A | 7/2000 | Belgard | ............. | 340/468 |
| 6,114,954 A * | 9/2000 | Palett et al. | ............. | 340/475 |
| 6,442,465 B2 | 8/2002 | Breed et al. | ............. | 701/45 |
| 6,461,008 B1 | 10/2002 | Pederson | ............. | 362/35 |
| 6,476,726 B1 | 11/2002 | Pederson | ............. | 340/815.45 |
| 6,547,410 B1 | 4/2003 | Pederson | ............. | 362/35 |
| 6,700,502 B1 | 3/2004 | Pederson | ............. | 340/815.45 |
| 6,705,745 B1 | 3/2004 | Pederson | ............. | 362/284 |
| 6,707,389 B2 | 3/2004 | Pederson | ............. | 340/815.45 |
| 6,717,376 B2 * | 4/2004 | Lys et al. | ............. | 315/292 |
| 6,720,871 B2 | 4/2004 | Boyer et al. | ............. | 340/479 |
| 7,119,672 B2 * | 10/2006 | Subbaraman | ............. | 340/465 |

OTHER PUBLICATIONS

"General Instructions for Installing the STS-1 Sequential Turn Signal System" from http://www.webelectricproducts.com/welcome.htm; 14 pages.

(Continued)

*Primary Examiner*—Travis R Hunnings
(74) *Attorney, Agent, or Firm*—Meyertons, Hood, Kivlin, Kowert & Goetzel, P.C.; Eric B. Meyertons (57) ABSTRACT

A light control system may include a signal coder (e.g., a flasher module), one or more motor vehicle light sources, and a signal decoder. The light control system may be a part of a motor vehicle taillight system. The signal coder may provide a selected signal. The selected signal may be a voltage signal having a modified portion when the signal coder is activated by a turn signal switch. The selected signal may be a substantially non-modified voltage signal when the signal coder is activated by a brake signal switch. The signal decoder may be coupled to the signal coder. The signal decoder may assess the selected signal from the signal coder to determine a selected lighting output of the motor vehicle light sources. The motor vehicle light sources may be coupled to the signal decoder. The motor vehicle light sources may provide the selected lighting output.

76 Claims, 4 Drawing Sheets

OTHER PUBLICATIONS

Questions and answers related to sequential turn signals from http://www.webelectricproducts.com/wlecome.htm; 10 pages.

"Installation guide to *HOTRONICS* Sequencing Tail Light Control" from http://www.hotronicsproducts.com/lighting.htm; 3 pages.

"Sequential Tail Lights" from http://www.bfranker.badz28.com96ss/96ss.htm; 6 pages.

"Advanced Turn Signals Sequential System © 1997-2003 for 1994-96 Impala SS and 1991-96 Caprice" from http://www.sequentialtailights.com; 7 pages.

"Advanced Turn Signals Professionally Designed for Sequential for 1996-2004 Ford Mustang" from http://www.sequentialtailights.com; 3 pages.

Web page and PDF download instruction for "Scott Drake's Sequential Tail Light System" from http://www.mustangdepot.com; 7 pages.

"Installing the Lewis-Scott Sequential Turn Signals (LSSTSM) on the 1994-1996 Chevrolet Impala SS" from http://www.blinkblink.com; 3 pages.

*Custom* Rodder, "All In Sequence Now Hotronics'LS6 Taillight Sequencer System" from http://www.customrodderweb.com/tech/0405cr_taillight/; 5 pages.

* cited by examiner

METHOD FOR AUTOMOTIVE LAMP CONTROL

BACKGROUND

1. Field of the Invention

The present invention generally relates to motor vehicle lamp control. Certain embodiments relate to systems and methods for control of motor vehicle taillight assemblies.

2. Description of Related Art

Some automobiles (e.g., older or "classic" automobiles) may not have wiring schemes associated with more recent automobiles that allow for enhanced lighting displays for various lighting functions such as turn signaling, braking, and/or road lighting. An example of an enhanced lighting display is the sequencing of lights during turn signal operation in a taillight assembly to generate the appearance of movement in the taillight assembly. Creating such an enhanced display may include replacing the existing light source (e.g., a single light source) with multiple light sources that may be programmed to sequence in order to create the light movement effect. Enhanced lighting displays may be desirable for aesthetic and/or safety reasons.

Certain older automobiles may have only two wires connected to a taillight assembly. These automobiles often have a dual filament incandescent bulb in each taillight assembly with one wire connected to one filament. One wire may be connected directly to the automobile's headlight switch (i.e., the driving lights switch) so that one filament is used as a driving light source. The second wire may be wired to the brake switch (i.e., brake on/off switch) and also to the turn signal switch. When the brake switch is activated (e.g., the brake pedal is depressed) then a single filament in the incandescent bulb is illuminated. If the turn signal switch is activated, a flashing circuit may be activated (e.g., by a flasher module located at or near a driver's compartment of the automobile) to turn the power (i.e., the voltage and current) supplied to the same filament connected to the brake switch on and off so that the filament displays a flashing turn signal. This flashing display occurs whether or not the brake switch is activated.

Kits and methods currently used to provide enhanced lighting displays on these automobiles may involve installing a centrally located microprocessor and adding additional lighting and/or wiring. Examples of these types of kits and methods include: Hotronics LS-6 Taillight sequencer (Hotronics Products, Anaheim, Calif.), Advanced Turn Signals sequential systems (Sanford, N.C.), Lewis-Scott Sequential Turn Signals (Blink Blink, Austin, Tex.), and STS-1 and STS-2 systems (Web Electric Products, Mayfield Heights, Ohio). These kits and methods may provide an enhanced lighting display (e.g., a sequenced lighting display) in the taillight assembly without distinguishing between whether the brake switch is activated or the turn signal switch is activated.

Some kits and methods may be used to replace a dual filament incandescent bulb with three individual dual filament bulbs. Adding the additional bulbs may require additional wiring between the dash area of the automobile and the new bulbs. Mechanical modifications may have to be made to the automobile to allow for the additional wiring. Some kits and methods include electromechanical relays (e.g., high power relays) to provide current to the incandescent bulbs.

Additional mechanical apparatus (e.g., microprocessors, electromechanical relays, lighting, and/or wiring) may be expensive and/or be susceptible to installation errors. Additional mechanical apparatus may affect the value and/or the function of the automobile (e.g., especially rare or one of a kind automobiles).

SUMMARY

In an embodiment, a light control system may include a signal coder (e.g., a flasher module), one or more motor vehicle light sources, and a signal decoder (e.g., a taillight module). The light control system may be a part of a motor vehicle taillight system. The signal coder may provide a selected signal. The signal decoder may be coupled to the signal coder. The signal decoder may assess the selected signal from the signal coder to determine a selected lighting output of the motor vehicle light sources. The motor vehicle light sources may be coupled to the signal decoder. The motor vehicle light sources may provide the selected lighting output. The signal decoder and the motor vehicle light sources may be part of a taillight assembly of a motor vehicle. In some embodiments, the signal coder, the signal decoder, and the motor vehicle light sources may be included in a kit.

In certain embodiments, a signal coder may provide a voltage signal to a signal decoder. A signal coder may modify at least one characteristic of the voltage signal when a turn signal is activated. For example, a signal coder may modify a portion of the voltage signal. In certain embodiments, a signal coder may provide a substantially constant voltage signal when a brake signal is activated. A signal decoder may assess one or more characteristics of the voltage signal (e.g., a modified portion of the voltage signal or a substantially constant voltage signal). One or more motor vehicle light sources coupled to a signal decoder may provide a selected output based on at least one assessed characteristic of the voltage signal as determined by the signal decoder.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Figure 1:
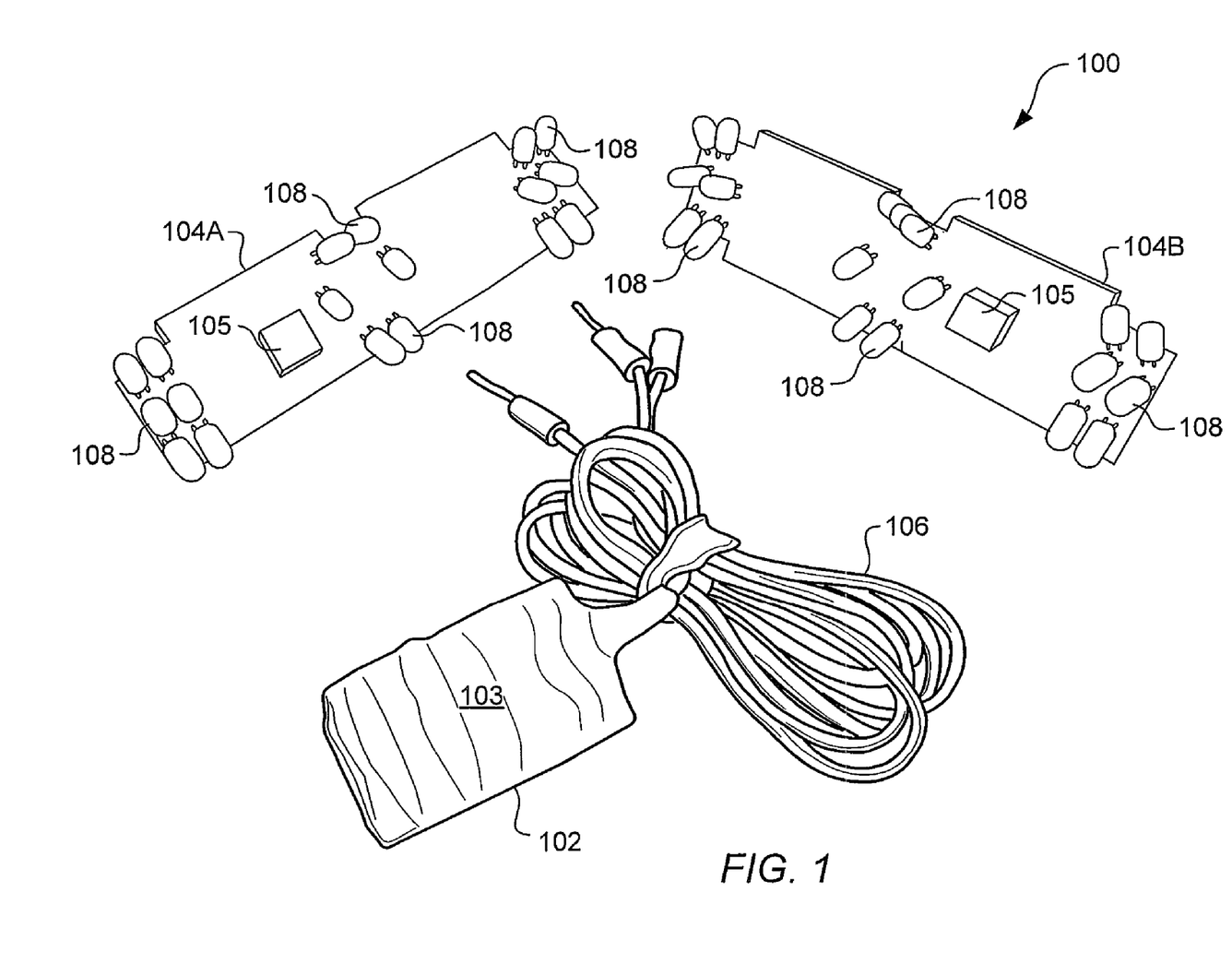
FIG. 1 depicts an embodiment of a kit for a light control system.

FIG. 1 depicts an embodiment of a kit for a light control system. In certain embodiments, kit 100 includes flasher module 102, left taillight module 104A, and right taillight module 104B. Flasher module 102 may replace an existing flasher module in a motor vehicle (i.e., an automobile, a truck, or a motorcycle). In certain embodiments, flasher module 102 may be designed to easily replace an existing flasher module. Flasher module 102 may be coupled to existing wiring in a motor vehicle (e.g., existing wiring used between a flasher module and the taillights in a motor vehicle). In some embodiments, flasher module 102 may have to be grounded to a motor vehicle (e.g., grounded to the chassis of the motor vehicle).

Kit 100 may include wiring 106. Wiring 106 may include a wiring assembly (e.g., an assembly including one or more wires). Wiring 106 may be coupled to flasher module 102. Wiring 106 may be used to couple flasher module 102 to existing wiring used in a motor vehicle (e.g., existing wiring used between a flasher module and the taillights in a motor vehicle). Wiring 106 may be coupled to existing wiring with any common coupler known in the art (e.g., wire clamps, push on connectors, and/or electrical tape). Wiring 106 may include one or more wires. In an embodiment, wiring 106 includes three wires. Wiring 106 with three wires may include, for example, a positive wire, a negative wire, and a neutral or ground wire. Wiring 106 may be color coded to allow a user to properly couple the wiring in a motor vehicle. For example, wiring 106 may include a blue wire, a red wire, and a black wire. In certain embodiments, wiring 106 may be permanently attached to flasher module 102 in kit 100. In some embodiments, kit 100 includes wiring 106 that may be coupled to flasher module 102 during installation.

Left taillight module 104A and right taillight module 104B may be used to replace light bulbs in the left taillight (i.e., driver's side taillight) and the right taillight (i.e., passenger's side taillight), respectively. Taillight modules 104A, 104B may be marked to identify which taillight assembly each taillight module is to be installed (e.g., an "L" and an "R" may be marked on the taillight modules). Taillight modules 104A, 104B may be designed to replace existing light bulbs in the taillight assemblies of a motor vehicle. In certain embodiments, taillight modules 104A, 104B may replace existing light bulbs that are used for turn signal lights, brake signal lights, driving lights, backup/reverse lights, or combinations thereof. In certain embodiments, taillight modules 104A, 104B may be designed to replace existing light bulbs and fit in a taillight assembly of a selected motor vehicle (i.e., the taillight modules may be designed for a certain type of motor vehicle). For example, taillight modules 104A, 104B may be used to replace dual filament light bulbs. A dual filament light bulb is typically used as a combination light with one filament used for the turn signal and brake signal light and one filament used for the driving light. In some embodiments, taillight modules 104A, 104B may be used to replace single filament light bulbs.

A design of taillight modules 104A, 104B may be varied by a manufacturer of the modules to allow use in a variety of motor vehicles. In some embodiments, taillight modules 104A, 104B may be modified and/or adapted by a user to fit into a taillight assembly of a motor vehicle. Thus, kit 100 may be modified for use in a variety of motor vehicles. Replacing existing light bulbs in taillight assemblies with taillight modules 104A, 104B may be less expensive and/or use less power to provide enhanced lighting outputs in motor vehicle taillight assemblies than replacing the existing light bulbs with a plurality of individual light bulbs (e.g., a plurality of dual filament light bulbs).

Taillight modules 104A, 104B may couple to a socket or a mount in a taillight assembly. Thus, taillight modules 104A, 104B may couple to existing wiring in a motor vehicle. In certain embodiments, additional wiring may not be needed to install and use flasher module 102, wiring 106, and taillight modules 104A, 104B in the motor vehicle.

Taillight modules 104A, 104B may include one or more light sources 108. In certain embodiments, light source 108 may include one or more light emitting diodes (LEDs). LEDs may be more efficient, use less power, and/or produce a brighter output for a selected power than other light sources. In some embodiments, light source 108 may include one or more incandescent light sources and/or other types of light sources used in motor vehicle taillight assemblies. In an embodiment, light sources 108 are red light sources. In some embodiments, light sources 108 may be another color, a combination of different colors, or capable to produce multiple colors. The color of light produced by light sources 108 may be selected based on a desired use of taillight modules 104A, 104B.

In some embodiments, taillight modules 104A, 104B may be coated with a light-transparent, water-resistant material. The light-transparent, water-resistant material may be a conformal coating. The light-transparent, water-resistant material may inhibit water from affecting a performance of taillight modules 104A, 104B.

Figure 2:
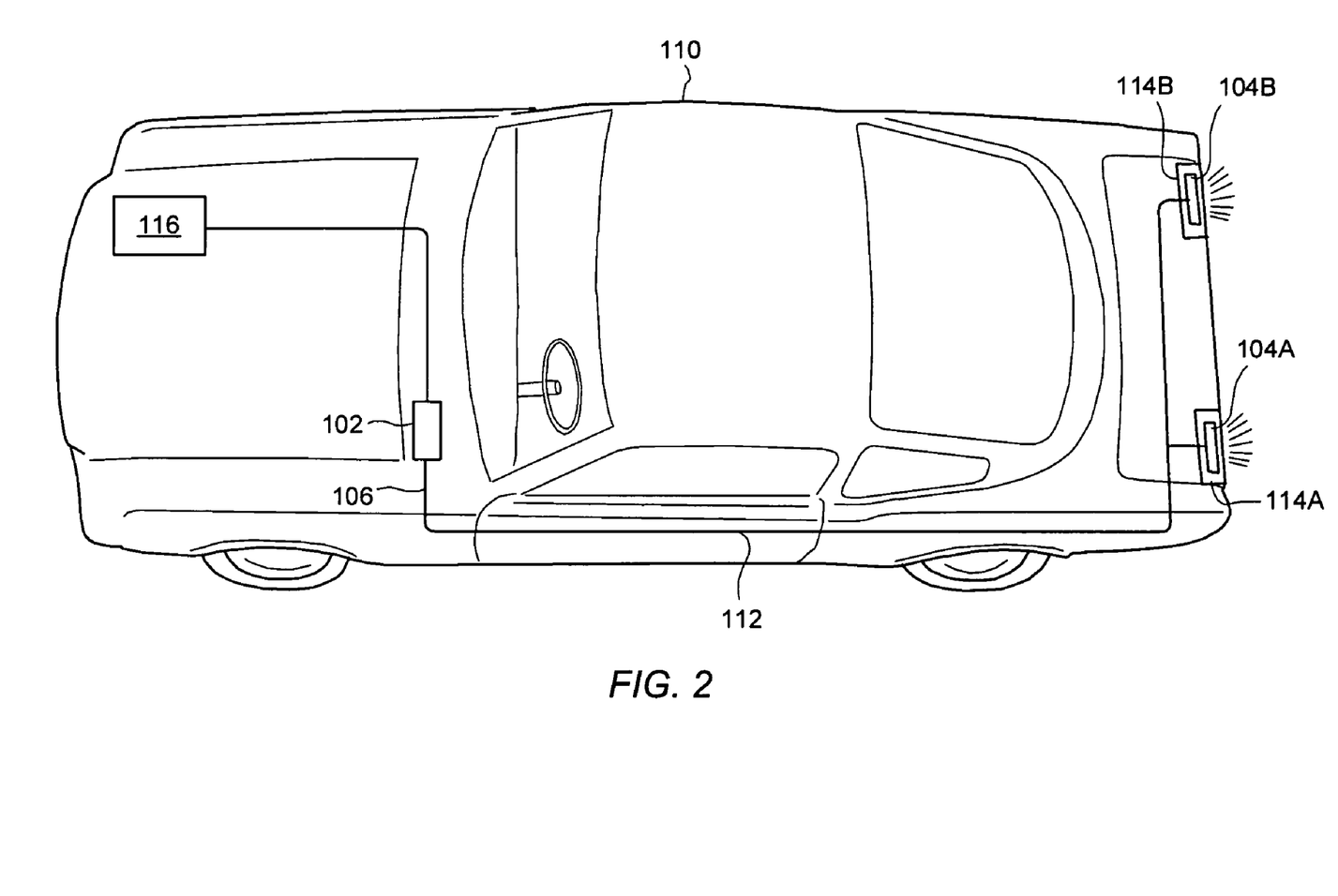
FIG. 2 depicts a schematic of an embodiment of a taillight system in a motor vehicle.

FIG. 2 depicts a schematic of an embodiment of a taillight system in a motor vehicle. A taillight system may include flasher module 102, wiring 106, and taillight modules 104A, 104B. Flasher module 102, wiring 106, and taillight modules 104A, 104B may replace one or more existing parts in a taillight system (e.g., an existing flasher module and existing light bulbs). Flasher module 102 may be located at or near the driver's side of motor vehicle 110. Flasher module 102 may be installed (e.g., mounted) at or near a location of an existing flasher module. In certain embodiments, flasher module 102 may be installed in the existing flasher module's location. In some embodiments, flasher module 102 may be installed or located under the dashboard near the existing flasher module's location.

Wiring 106 may couple flasher module 102 to existing vehicle wiring 112. Vehicle wiring 112 may be coupled to left taillight assembly 114A and right taillight assembly 114B. Left taillight module 104A may be installed in left taillight assembly 114A. Right taillight module 104B may be installed in right taillight assembly 114B. In some embodiments, taillight assemblies 114A, 114B may include other light sources such as driving lights and/or backup/reverse lights.

Flasher module 102 may provide or distribute power to taillight modules 104A, 104B. For example, flasher module 102 may be coupled to battery 116 and provide the batter power to taillight modules 104A, 104B. Battery 116 may provide a direct current (DC) voltage to flasher module 102 and taillight modules 104A, 104B. The DC voltage provided by battery 116 may be referred to as a DC voltage signal.

Figure 3:
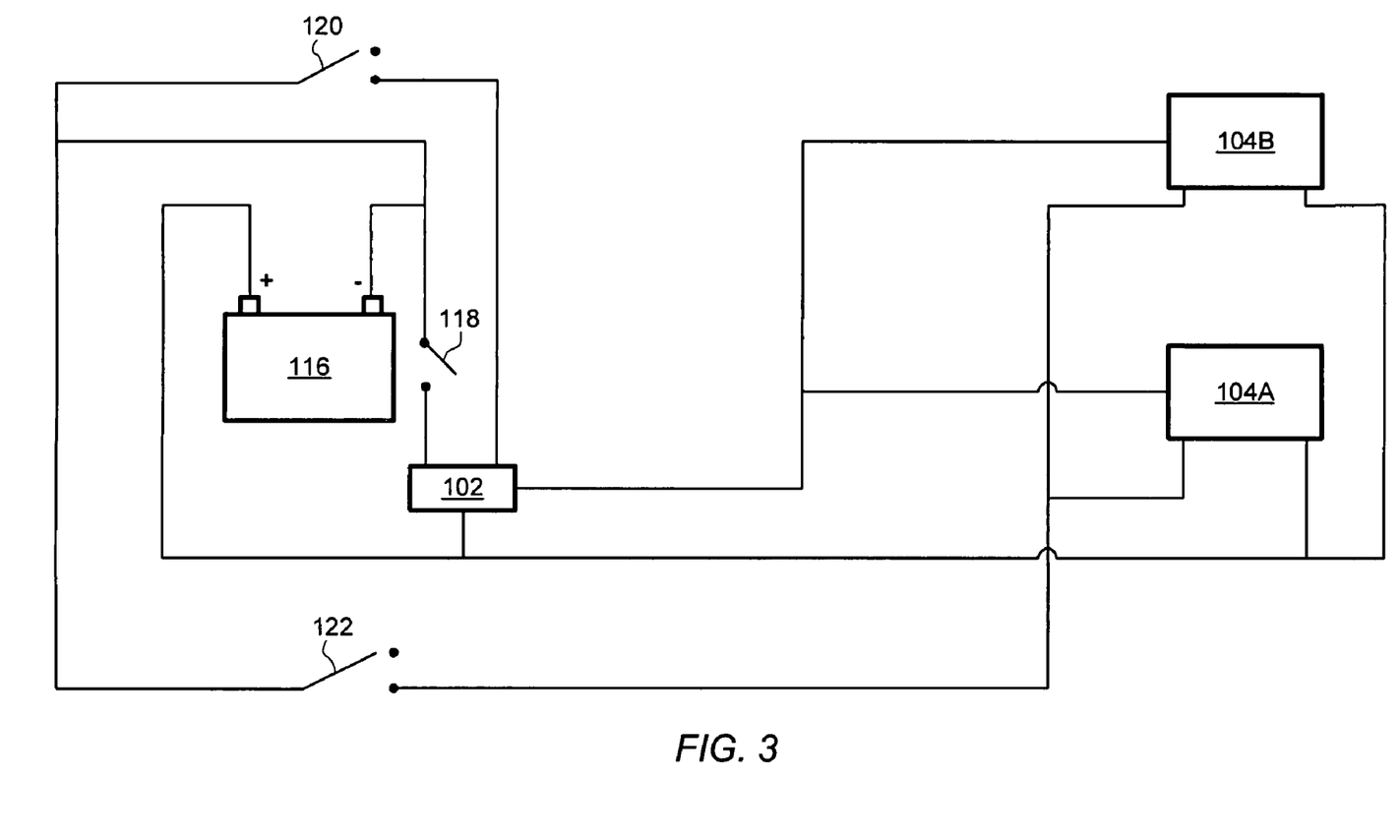
FIG. 3 depicts a wiring schematic of an embodiment of a taillight system.

FIG. 3 depicts a wiring schematic of an embodiment of a taillight system. In the embodiment depicted in FIG. 3, the wiring schematic may be for an existing dual filament taillight assembly. A wiring schematic may be different for other types of taillight assemblies and/or be different between different motor vehicles. Flasher module 102 may be coupled to battery 116. Turn signal switch 118 may be coupled between battery 116 and flasher module 102. Turn signal switch 118 may be operated by a turn signal device (e.g., a turn signal lever coupled to a steering column of a motor vehicle). Turn signal switch 118 may indicate to flasher module 102 which side (e.g., left side or right side) of the vehicle is needed to signal a turn. Brake signal switch 120 may be coupled between battery 116 and taillight modules 104A, 104B. In certain embodiments, as shown in FIG. 3, brake signal switch 120, flasher module 102, and turn signal switch 118 may be coupled to the same wiring leading to taillight modules 104A, 104B.

Driving lights switch 122 may be coupled between battery 116 and taillight modules 104A, 104B. In certain embodiments, taillight modules 104A, 104B may include light sources 108, depicted in FIG. 1, that operate as turn signal light sources, brake signal light sources, and driving light sources. In some embodiments, taillight modules 104A, 104B may include light sources 108 that operate as turn signal light sources and brake signal light sources along with light sources 108' that operate separately as driving light sources. In some embodiments, driving lights switch 122 may be coupled to other taillight modules so that the driving lights switch operates light sources other than those in taillight modules 104A, 104B.

As shown in FIG. 3, turn signal switch 118, brake signal switch 120, and driving lights switch 122 may operate to turn on/off power to taillight modules 104A, 104B. In an embodiment of a dual filament taillight assembly, brake signal switch 120 may operate to turn on both filaments in each of taillight modules 104A, 104B. Driving lights switch 122 may operate to turn on only one filament in each of taillight modules 104A, 104B. Thus, taillight modules 104A, 104B may provide a greater brightness during braking light operation than during driving light operation.

In some embodiments, a motor vehicle may include two taillight assemblies on one side that operate similarly to a dual filament taillight assembly. For example, both taillight assemblies may light during braking light operation and only one during driving light operation or only one taillight assembly may light during either braking light or driving light operation with the braking light taillight assembly being brighter than the driving light taillight assembly. In some embodiments, the power provided through brake signal switch 120 and driving lights switch 122 may be different. For example, the power provided through brake signal switch 120 may be greater (e.g., twice the power) than the power provided through driving lights switch 120, so that the brake signal output is brighter than the driving light output.

Operation of flasher module 102 may be triggered by on/off operation of turn signal switch 118. In certain embodiments, flasher module 102 includes a signal coder 103 (e.g., a voltage signal coder) and taillight modules 104A, 104B each include signal decoder 105 (e.g., a voltage signal decoder) as shown in FIG. 1. For example, flasher module 102 and/or taillight modules 104A, 104B may include microprocessors or digital circuits that provide and/or accept (e.g., interpret or decode) a coded signal. Microprocessors and/or digital circuits may be small and inexpensive devices used for providing and/or accepting a coded signal. A coded signal may include a modified or modulated signal.

In certain embodiments, flasher module 102 may modify or modulate a portion of the voltage signal from battery 116. Flasher module 102 may be programmable to modify or modulate a portion of the voltage signal from battery 116. Taillight modules 104A, 104B may accept the modulated portion and may be able to interpret the modulated portion of the voltage signal. For example, taillight modules 104A, 104B may use a sampling algorithm to interpret the modulated portion of the voltage signal. In an embodiment, flasher module 102 may modulate a waveform of a portion of the voltage signal from battery 116. Taillight modules 104A, 104B may accept the waveform and interpret the modulated portion of the waveform.

Figure 4:
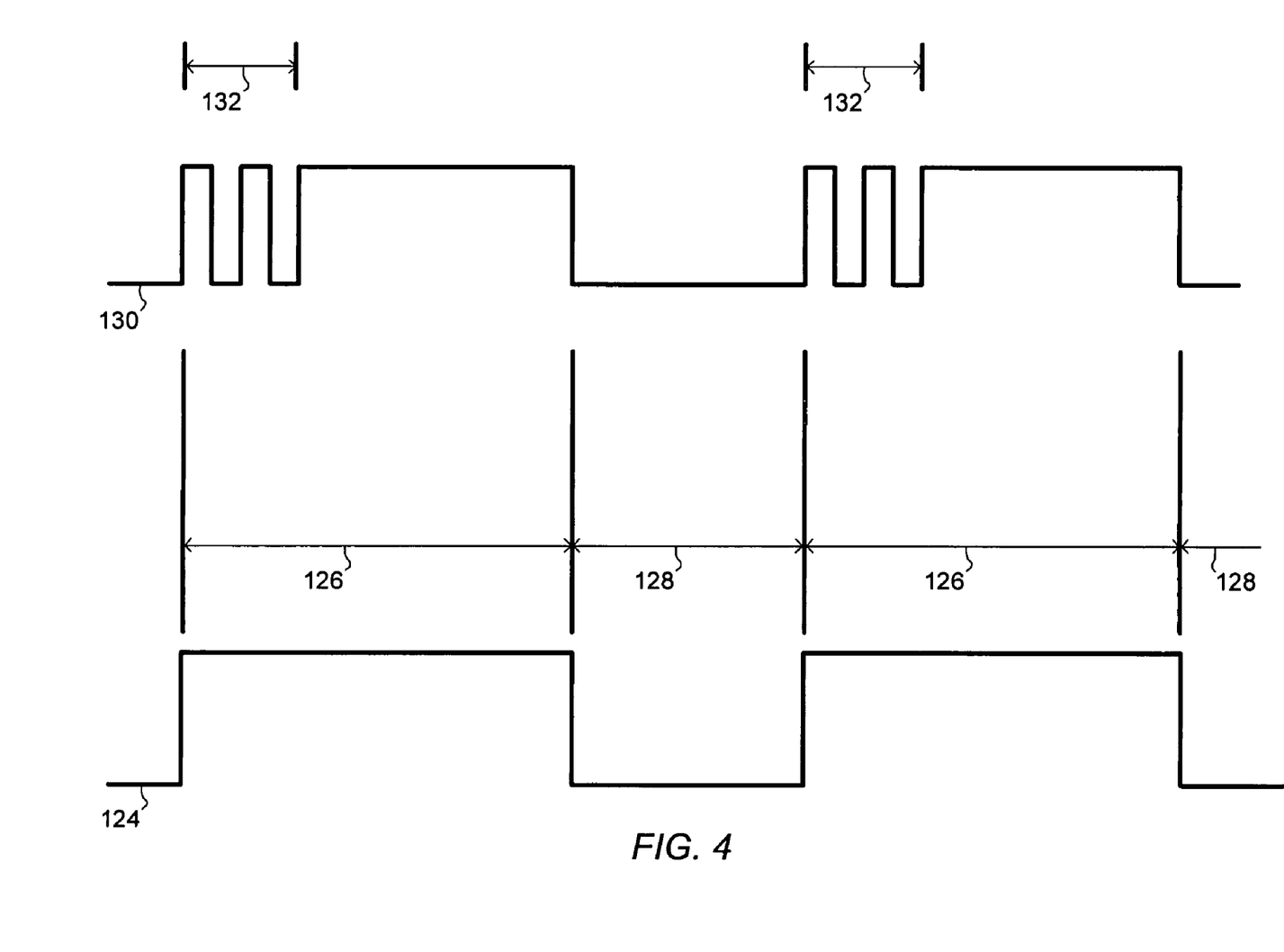
FIG. 4 depicts an embodiment of a normal waveform and a modulated waveform of a voltage signal.

FIG. 4 depicts an embodiment of a normal waveform and a modulated waveform of a voltage signal. Waveform 124 may be a waveform for an existing flasher module (i.e., a normal flasher module that flashes a turn signal at a frequency detectable by the human eye). Waveform 124 may include "signal on" periods 126 with the voltage signal at a maximum for the turn signal and "signal off" periods 128 with substantially zero voltage. Signal on periods 126 may provide power to a taillight module.

Waveform 130 may be a waveform formed by flasher module 102, shown in FIGS. 1-3. As shown in FIG. 4, waveform 130 may include modified portion 132 during signal on periods 126. In certain embodiments, modified portion 132 may be a beginning portion of signal on period 126 (i.e., modified portion 132 is a "pre-amble" of signal on period 126). A remaining portion of signal on period 126 may provide power to taillight modules 104A, 104B, shown in FIGS. 1-3. In an embodiment, modified portion 132 may be modulated, as shown in FIG. 4. Modified portion 132 may include a variable series of on/off periods for the voltage signal provided to taillight modules 104A, 104B. Modified portion 132 may be modified (e.g., modulated) at one or more frequencies that are relatively high and undetectable by the human eye. For example, modified portion 132 may be modulated at frequencies between about 60 Hz (Hertz) and about 200 Hz.

Modified portion 132 may be modified so that a selected lighting output is produced in taillight modules 104A, 104B. Thus, a selected lighting output is determined by modified portion 132. For example, modified portion 132 may be modified so that taillight modules 104A, 104B produce a light sequencing output. A light sequencing output may include sequencing one or more rows of light sources 108, depicted in FIG. 1, such that a taillight assembly sequentially illuminates from one side of the taillight assembly to the other. In some embodiments, modified portion 132 may be modified so that taillight modules 104A, 104B produce a variable rate, light flashing output, a variable brightness, light flashing output, or other bright/dim type light functions. In some embodiments, modified portion 132 may be modified so that taillight modules 104A, 104B produce color changes and/or selected graphic displays. For example, a motor vehicle may provide a yellow light output for a driving taillight display and a red light output for a braking taillight display. In another example, a motor vehicle may provide a text display (e.g., "stop" or "left turn"). Flasher module 102 and taillight modules 104A, 104B may be designed to produce a variety of light outputs. In some embodiments, flasher module 102 may be controlled by a user (e.g., a driver or a passenger) so that the user may select a desired lighting output for taillight modules 104A, 104B. In some embodiments, flasher module 102 may be programmable (e.g., software or logic controlled) so that the selected lighting output changes from one turn signal operation to the next turn signal operation.

In some embodiments, brake signal switch 120 may operate to provide to taillight modules 104A, 104B a normal square waveform without any modified portion or pre-amble (e.g., similar to waveform 124, depicted in FIG. 4) for brake signal operation. Thus, if brake signal switch 120 is turned on, a non-modified voltage signal may be provided to taillight modules 104A, 104B, which may interpret the non-modified voltage signal as an instruction to provide a brake lighting output as the selected lighting output. Flasher module 102 may provide modified portion 132 to taillight modules 104A, 104B during turn signal operation so that the taillight modules operate differently during turn signal operation than during brake signal operation. Thus, use of flasher module 102 and taillight modules 104A, 104B allows selected lighting output during brake signal operation that is distinguishable from selected lighting output during turn signal operation.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A motor vehicle light control system for a motor vehicle, comprising:
   one or more motor vehicle light sources;
   a signal coder coupled to the motor vehicle light sources, wherein the signal coder is configured to provide a selected signal and power to the motor vehicle light sources, wherein the selected signal and the power are provided as a voltage signal having a modified portion, the modified portion comprising a series of on/off voltage periods, and wherein the signal coder is configured to provide the selected signal and the power as both the voltage signal having the modified portion when the signal coder is activated by a turn signal switch on the motor vehicle and a substantially non-modified voltage signal when the signal coder is activated by a brake signal switch on the motor vehicle; and
   a signal decoder coupled to the signal coder and the motor vehicle light sources, wherein the signal decoder is configured to assess the selected signal to determine a selected lighting output for the motor vehicle light sources.

2. The system of claim 1, wherein the motor vehicle light sources comprise motor vehicle taillight bulbs.

3. The system of claim 1, wherein the motor vehicle light sources comprise one or more LEDs.

4. The system of claim 1, wherein the motor vehicle light sources are part of a taillight assembly of the motor vehicle.

5. The system of claim 1, wherein the lighting control system comprises a portion of a taillight system of the motor vehicle.

6. The system of claim 1, wherein the signal coder comprises a motor vehicle flasher module.

7. The system of claim 1, wherein the signal decoder is part of a taillight assembly of the motor vehicle.

8. The system of claim 1, wherein the signal coder and the signal decoder are part of a taillight system of the motor vehicle, and wherein the signal coder and the signal decoder are coupled to an existing wiring system of the motor vehicle.

9. The system of claim 1, wherein the modified portion comprises a portion of the voltage signal modulated at a frequency between 60 Hz and 200 Hz.

10. The system of claim 1, wherein the signal coder is configured to form the modified portion of the voltage signal to determine the selected lighting output of the motor vehicle light sources.

11. The system of claim 1, wherein the signal coder is programmable to form the modified portion of the voltage signal to determine the selected lighting output of the motor vehicle light sources.

12. The system of claim 1, wherein the signal decoder is configured to assess the modified portion of the voltage signal to determine the selected lighting output of the motor vehicle light sources.

13. The system of claim 1, wherein the selected lighting output comprises a light sequencing output when the signal coder is activated by a turn signal switch on the motor vehicle.

14. The system of claim 1, wherein the selected lighting output comprises a variable rate, light flashing output when the signal coder is activated by a turn signal switch on the motor vehicle.

15. The system of claim 1, wherein the selected lighting output comprises a variable brightness, light flashing output when the signal coder is activated by a turn signal switch on the motor vehicle.

16. The system of claim 1, wherein the selected lighting output comprises a brake lighting output when the signal coder is activated by a brake signal switch on the motor vehicle.

17. A motor vehicle light control system for a motor vehicle, comprising:
   one or more motor vehicle light sources;
   a signal coder coupled to the motor vehicle light sources, wherein the signal coder is configured to provide a selected signal and power to the motor vehicle light sources, wherein the selected signal and the power are provided as a voltage signal having a modified portion, the modified portion comprising a series of on/off voltage periods, and wherein the signal coder is configured to provide the selected signal and the power as a substantially non-modified voltage signal when the signal coder is activated by a brake signal switch on the motor vehicle; and
   a signal decoder coupled to the signal coder and the motor vehicle light sources, wherein the signal decoder is configured to assess the selected signal to determine a selected lighting output for the motor vehicle light sources.

18. The system of claim 17, wherein the motor vehicle light sources comprise motor vehicle taillight bulbs.

19. The system of claim 17, wherein the motor vehicle light sources comprise one or more LEDs.

20. The system of claim 17, wherein the motor vehicle light sources are part of a taillight assembly of the motor vehicle.

21. The system of claim 17, wherein the lighting control system comprises a portion of a taillight system of the motor vehicle.

22. The system of claim 17, wherein the signal coder comprises a motor vehicle flasher module.

23. The system of claim 17, wherein the signal decoder is part of a taillight assembly of the motor vehicle.

24. The system of claim 17, wherein the signal coder and the signal decoder are part of a taillight system of the motor vehicle, and wherein the signal coder and the signal decoder are coupled to an existing wiring system of the motor vehicle.

25. The system of claim 17, wherein the modified portion comprises a portion of the voltage signal modulated at a frequency between 60 Hz and 200 Hz.

26. The system of claim 17, wherein the signal coder is configured to form the modified portion of the voltage signal to determine the selected lighting output of the motor vehicle light sources.

27. The system of claim 17, wherein the signal coder is programmable to form the modified portion of the voltage signal to determine the selected lighting output of the motor vehicle light sources.

28. The system of claim 17, wherein the signal decoder is configured to assess the modified portion of the voltage signal to determine the selected lighting output of the motor vehicle light sources.

29. The system of claim 17, wherein the signal coder is configured to provide the selected signal and the power as the voltage signal having the modified portion when the signal coder is activated by a turn signal switch on the motor vehicle.

30. The system of claim 17, wherein the selected lighting output comprises a brake lighting output when the signal coder is activated by a brake signal switch on the motor vehicle.

31. A motor vehicle light control system kit for a motor vehicle, comprising:
one or more motor vehicle light sources configured to provide a selected lighting output, wherein the motor vehicle light sources are configured to be located in a taillight assembly of the motor vehicle;
a signal coder coupled to the motor vehicle light sources, wherein the signal coder is configured to provide a selected signal and power to the motor vehicle light sources, wherein the selected signal and the power are provided as a voltage signal having a modified portion, the modified portion comprising a series of on/off voltage periods, and wherein the signal coder is configured to provide the selected signal and the power as both the voltage signal having the modified portion when the signal coder is activated by a turn signal switch on the motor vehicle and a substantially non-modified voltage signal when the signal coder is activated by a brake signal switch on the motor vehicle; and
a signal decoder coupled to the signal coder and the light sources, wherein the signal decoder is configured to assess the selected signal to determine the selected lighting output of the motor vehicle light sources.

32. The kit of claim 31, further comprising a wiring assembly configured for coupling the signal coder to the motor vehicle light sources and the signal decoder.

33. The kit of claim 31, further comprising a wiring assembly configured for coupling the signal coder to the motor vehicle light sources and the signal decoder, wherein the wiring assembly is configured to couple to existing wiring in the motor vehicle.

34. The kit of claim 31, wherein the motor vehicle light sources comprises motor vehicle taillight bulbs.

35. The kit of claim 31, wherein the motor vehicle light sources comprise one or more LEDs.

36. The kit of claim 31, wherein the motor vehicle light sources and the signal decoder are coupled to a taillight assembly mount.

37. The kit of claim 31, wherein the motor vehicle light sources are configured to replace at least one existing light source on the motor vehicle.

38. The kit of claim 31, wherein the motor vehicle light sources are configured to replace at least one existing dual filament light source on the motor vehicle.

39. The kit of claim 31, wherein the kit is configured to replace part of a taillight system of the motor vehicle.

40. The kit of claim 31, wherein the kit is configured to be a part of an existing taillight system of the motor vehicle.

41. The kit of claim 31, wherein the signal coder is configured to replace a flasher module of the motor vehicle.

42. The kit of claim 31, wherein the signal decoder is configured to be located in the taillight assembly of the motor vehicle.

43. The kit of claim 31, wherein the modified portion comprises a portion of the voltage signal modulated at a frequency between 60 Hz and 200 Hz.

44. The kit of claim 31, wherein the signal coder is configured to provide the modified portion of the voltage signal to determine the selected lighting output of the motor vehicle light sources.

45. The kit of claim 31, wherein the signal coder is programmable to provide the modified portion of the voltage signal to determine the selected lighting output of the motor vehicle light sources.

46. The kit of claim 31, wherein the signal decoder is configured to assess the modified portion of the voltage signal to determine the selected lighting output of the motor vehicle light sources.

47. The kit of claim 31, wherein the selected lighting output comprises a brake lighting output when the signal coder is activated by a brake signal switch on the motor vehicle.

48. A motor vehicle light control system kit for a motor vehicle, comprising:
one or more motor vehicle light sources configured to provide a selected lighting output, wherein the motor vehicle light sources are configured to be located in a taillight assembly of the motor vehicle;
a signal coder coupled to the motor vehicle light sources, wherein the signal coder is configured to provide a selected signal and power to the motor vehicle light sources, wherein the selected signal and the power are provided as a voltage signal having a modified portion, the modified portion comprising a series of on/off voltage periods, and wherein the signal coder is configured to provide the selected signal and the power as a substantially non-modified voltage signal when the signal coder is activated by a brake signal switch on the motor vehicle; and
a signal decoder coupled to the signal coder and the light sources, wherein the signal decoder is configured to assess the selected signal to determine the selected lighting output of the motor vehicle light sources.

49. The kit of claim 48, further comprising a wiring assembly configured for coupling the signal coder to the motor vehicle light sources and the signal decoder.

50. The kit of claim 48, further comprising a wiring assembly configured for coupling the signal coder to the motor vehicle light sources and the signal decoder, wherein the wiring assembly is configured to couple to existing wiring in the motor vehicle.

51. The kit of claim 48, wherein the motor vehicle light sources comprises motor vehicle taillight bulbs.

52. The kit of claim 48, wherein the motor vehicle light sources comprise one or more LEDs.

53. The kit of claim 48, wherein the motor vehicle light sources and the signal decoder are coupled to a taillight assembly mount.

54. The kit of claim 48, wherein the motor vehicle light sources are configured to replace at least one existing light source on the motor vehicle.

55. The kit of claim 48, wherein the motor vehicle light sources are configured to replace at least one existing dual filament light source on the motor vehicle.

56. The kit of claim 48, wherein the kit is configured to replace part of a taillight system of the motor vehicle.

57. The kit of claim 48, wherein the kit is configured to be a part of an existing taillight system of the motor vehicle.

58. The kit of claim 48, wherein the signal coder is configured to replace a flasher module of the motor vehicle.

59. The kit of claim 48, wherein the signal decoder is configured to be located in the taillight assembly of the motor vehicle.

60. The kit of claim 48, wherein the modified portion comprises a portion of the voltage signal modulated at a frequency between 60 Hz and 200 Hz.

61. The kit of claim 48, wherein the signal coder is configured to provide the modified portion of the voltage signal to determine the selected lighting output of the motor vehicle light sources.

62. The kit of claim 48, wherein the signal decoder is configured to assess the modified portion of the voltage signal to determine the selected lighting output of the motor vehicle light sources.

63. The kit of claim 48, wherein the signal coder is configured to provide the selected signal and the power as the voltage signal the modified portion when the signal coder is activated by a turn signal switch on the motor vehicle.

64. The kit of claim 48, wherein the selected lighting output comprises a brake lighting output when the signal coder is activated by a brake signal switch on the motor vehicle.

65. A method for controlling motor vehicle light output on a motor vehicle, comprising:
providing a voltage signal from a signal coder to one or more motor vehicle light sources located on the motor vehicle;
providing power to the motor vehicle light sources with the voltage signal from the signal coder, wherein the voltage signal has a modified portion, the modified portion comprising a series of on/off voltage periods;
assessing one or more characteristics of the voltage signal;
providing a selected output from the motor vehicle light sources based on at least one assessed characteristic of the voltage signal; and
providing a brake lighting output from the motor vehicle light sources when at least one assessed characteristic of the voltage signal comprises a non-modulated waveform of the voltage signal.

66. The method of claim 65, wherein the motor vehicle light sources are part of a taillight assembly on the motor vehicle.

67. The method of claim 65, wherein the motor vehicle light sources comprise one or more motor vehicle taillight bulbs.

68. The method of claim 65, wherein the motor vehicle light sources comprise one or more LEDs.

69. The method of claim 65, wherein the signal coder comprises a flasher module for the motor vehicle.

70. The method of claim 65, further comprising assessing the one or more characteristics of the voltage signal using a signal decoder coupled to the motor vehicle light sources.

71. The method of claim 65, further comprising modifying at least one characteristic of the voltage signal using the signal coder.

72. The method of claim 65, further comprising modifying at least one characteristic of the voltage signal using the signal coder when a turn signal switch on the motor vehicle is activated.

73. The method of claim 65, further comprising modifying at least one characteristic of the voltage signal using the signal coder, wherein modifying the at least one characteristic comprises modulating a portion of the voltage signal at a frequency between 60 Hz and 200 Hz.

74. The method of claim 65, further comprising modifying at least one characteristic of the voltage signal using the signal coder, and determining the selected output based on the modified characteristic of the voltage signal.

75. The method of claim 65, further comprising providing a substantially constant voltage signal when a brake signal on the motor vehicle is activated.

76. The method of claim 65, wherein at least one assessed characteristic of the voltage signal comprises a waveform of the voltage signal.

* * * * *